United States Patent
Wang et al.

(10) Patent No.: US 12,315,252 B1
(45) Date of Patent: May 27, 2025

(54) METHOD FOR IDENTIFYING SIMILAR OBJECTS IN REMOTE SENSING IMAGES WITH SPECTRAL SIMILARITY BASED ON CONDITION NUMBER OF MATRIX

(71) Applicant: Chengdu University of Technology, Chengdu (CN)

(72) Inventors: Maozhi Wang, Chengdu (CN); Wenxi Xu, Chengdu (CN)

(*) Notice: Subject to any disclaimer, the term of this patent is extended or adjusted under 35 U.S.C. 154(b) by 0 days.

(21) Appl. No.: 18/926,149

(22) Filed: Oct. 24, 2024

(30) Foreign Application Priority Data

Jan. 12, 2024 (CN) .......................... 202410045853.0

(51) Int. Cl.
*G06K 9/00* (2022.01)
*G06V 10/58* (2022.01)
(Continued)

(52) U.S. Cl.
CPC ............ *G06V 20/194* (2022.01); *G06V 10/58* (2022.01); *G06V 10/761* (2022.01)

(58) Field of Classification Search
None
See application file for complete search history.

(56) References Cited

U.S. PATENT DOCUMENTS

| | | | | |
|---|---|---|---|---|
| 8,571,325 | B1* | 10/2013 | Robinson | G06V 20/13 382/103 |
| 9,552,638 | B2* | 1/2017 | Lavigne | G06F 18/23 |

(Continued)

FOREIGN PATENT DOCUMENTS

| | | |
|---|---|---|
| CN | 106778494 A | 5/2017 |
| CN | 108427934 A | 8/2018 |

(Continued)

OTHER PUBLICATIONS

Wang, Maozhi et. al., Research Progress on Endmenber Extraction Algorithm and Its Classification of Hyperspectral Remote Sensing Imagery, Remote Sensing Technology and Application, Aug. 15, 2015, vol. 30, No. 4, pp. 616-625.

(Continued)

*Primary Examiner* — S J Park
(74) *Attorney, Agent, or Firm* — Novoclaims Patent Services LLC; Mei Lin Wong

(57) ABSTRACT

A method for identifying similar ground objects with spectral similarity in a remote sensing image based on condition number of matrix includes the steps of: obtaining sample's spectral curve of the ground object to be identified, and constructing the sample spectrum matrix A according to the number of bands of the image and the number of categories of ground objects; sequentially obtaining distance index vectors between the spectrum P of the pixel to be identified and each category of ground objects in A; calculating a distance error of each type of ground object when P is identified; then calculating a distance error threshold vector of A; classifying and identifying the pixels. This method uses linear system of equations and the condition number theory to transform ill-conditioned equations into well-conditioned equations, thereby adding significant identifiable features to the ground objects to improve the identification performance and avoid constructing large training samples.

4 Claims, 14 Drawing Sheets

(51) Int. Cl.
*G06V 10/74* (2022.01)
*G06V 20/10* (2022.01)

(56) References Cited

U.S. PATENT DOCUMENTS

| | | | |
|---|---|---|---|
| 10,255,296 B2* | 4/2019 | Fentzke | G06F 16/51 |
| 10,691,974 B2* | 6/2020 | Lin | G06V 20/13 |
| 2016/0305820 A1 | 10/2016 | Zollars et al. | |

FOREIGN PATENT DOCUMENTS

| | | |
|---|---|---|
| CN | 109799442 A | 5/2019 |
| CN | 111860104 A | 10/2020 |
| CN | 113657324 A | 11/2021 |
| CN | 115115943 A | 9/2022 |
| CN | 116206211 A | 6/2023 |
| CN | 116612080 A | 8/2023 |

OTHER PUBLICATIONS

Hao, Zhen, Research on Dynamic Monitoring Method of Actual Irrigation Area Based on Multi-Source Remote Sensing Data, Chinese Doctoral Dissertation Full Text Database—Agricultural Science and Technology Collection, Mar. 15, 2022, D043-6.

Cui Yanrong, Analysis and Application of Hyperspectral Remote Sensing Data Fusion Method Based on Nonnegative Matrix Factorization, Chinese Excellent Master's Thesis Full Text Database—Basic Science Collection, Mar. 15, 2016, A008-87.

Bo Zhao et al.,Performance Improvement of Deception Jamming Against SAR Based on Minimum Condition Number, IEEE Journal of Selected Topics in Applied Earth Observations and Remote Sensing, Oct. 24, 2016, vol. 10, No. 03, Mar. 2017, pp. 1039-1055.

* cited by examiner

Obtain a sample spectrum of a ground object to be identified & construct a sample spectrum matrix $A$ based on no. of bands of remote sensing image & no. of categories of the ground object to be identified Sequentially calculate distance index vectors $X_{\lambda 1} \sim X_{\lambda N}$ between spectrum $P$ of a pixel to be identified & $1^{st}$ to $N^{th}$ categories of ground objects in $A$ of remote sensing image, where $X_{\lambda k}$ is obtained from equation $(A+\lambda I)X_{\lambda k} = P + \lambda 1_k$ Calculate distance error of $P$ being identified as one of the categories of the selected ground objects, wherein distance error of $P$ being identified as the $k$-th category ground object is Dist(Pk)

Calculate error threshold $\theta_1$ to $\theta_n$ of $1^{st}$ to $N^{th}$ category ground objects, construct A's distance error threshold vector $\theta=(\theta_1,\theta_2,...\theta_n)$ Process identification of ground object category of the pixel to be identified based on distance errors and distance error threshold vectors

FIG.1

METHOD FOR IDENTIFYING SIMILAR OBJECTS IN REMOTE SENSING IMAGES WITH SPECTRAL SIMILARITY BASED ON CONDITION NUMBER OF MATRIX

CROSS REFERENCE OF RELATED APPLICATION

This is a non-provisional application that claims priority to Chinese application number 2024100458530, filing date Jan. 12, 2024, the entire contents of which are expressly incorporated herein by reference.

BACKGROUND OF THE PRESENT INVENTION

Field of Invention

The present invention relates to a method for identifying similar objects in remote sensing images with spectral similarity, in particular related to a method for identifying similar objects in remote sensing images with spectral similarity based on condition number of matrix.

Description of Related Arts

Identification of spectrally similar objects in remote sensing images has always been a technical problem, especially for multispectral remote sensing images. Due to the limited band information, the difference in the spectral curves of spectrally similar objects is weak. Traditional difference recognition methods based on various distance metrics of spectral curves are prone to misidentification, which greatly reduces the recognition accuracy of similar objects in remote sensing images.

In view of the problem of misidentification of spectrally similar objects in remote sensing images, traditional methods based on simple band calculation and color synthesis can no longer meet the accuracy requirements. In particular, for multispectral remote sensing images, due to the limited band information, various methods based on spectral distance measurement or spectral characteristic parameters constructed using part or all of the information of the spectral curve, including spectral angle mapping (SAM), minimum distance (MD), Mahalanobis distance (MC), and maximum likelihood (ML), will produce relatively more misidentifications, thereby reducing the recognition accuracy. At present, some recognition models based on deep learning have received attention and been proposed to address this problem. Although these models have improved recognition accuracy to a certain extent, it is difficult to overcome the limitation of constructing a large number of samples. In addition, there are also recognition systems based on expert systems, such as USGS Tetracorder, which has been proposed and applied, but this system requires the cooperation of experts with rich professional background knowledge to achieve good results.

Terminology Explanation

Spectral curve: The characteristics of electromagnetic waves reflected and radiated by different ground objects, due to their different types and environmental conditions, vary with wavelength. It is usually represented by a curve in a two-dimensional geometric space, with the horizontal axis representing the wavelength $\lambda$ (or wave number) and the vertical axis representing the reflectivity p (or pixel value), which is called a spectrum curve. The spectrum of ground objects can be measured by instruments, such as spectrometers, or obtained from hyperspectral/hyperspectral images.

SUMMARY OF THE PRESENT INVENTION

In order to solve the above technological problems, an object of the present invention is to provide a method for identifying similar objects in remote sensing images with spectral similarity based on condition number of matrix, further to solve the problems of various recognition methods based on deep learning models in this field that require large quantities of sample data and the limitation that recognition methods based on expert systems require expert knowledge support, and also to overcome the low accuracy limitation caused by traditional recognition methods based on various distance metrics.

In order to achieve the above objectives, the technical solution adopted by the present invention is a method for identifying similar ground objects with spectral similarity in remote sensing images based on condition number of matrix, comprising the steps of:

S1: construct a sample spectrum matrix A;

Obtain a sample spectrum of a ground object to be identified (for each category of the ground objects to be identified, one sample with one particular spectrum is obtained), according to the number of bands of the remote sensing image and the number of categories of the ground object to be identified, construct a sample spectrum matrix A with N rows and N columns, wherein each column vector of A is a spectrum of one category of the ground object to be identified, and a 1-st to N-th column vectors correspond to a 1-st to N-th categories of the ground objects to be identified respectively, S2: Sequentially calculate the distance index vectors $X_{\lambda 1} \sim X_{\lambda N}$ between a spectrum P of a pixel to be identified and the 1-st to the N-th categories of the objects in A selected and constructed from the remote sensing image, wherein a distance index vector $X_{\lambda k}$ between P and a k-th class of the selected objects is calculated and obtained according to the following equation (1):

$$(A+\lambda I)X_{\lambda k} = P + \lambda I_k \tag{1}$$

In equation (1), k=1~N, $\lambda$ is additional supplementary spectral feature information, $\lambda$=N+1, I is the N-order unit matrix, $I_k$ is a N-dimensional unit column vector with the k-th element being set to 1 and the remaining being set to 0, $X_{\lambda k} = (x_{\lambda k}^1, x_{\lambda k}^2, \ldots, x_{\lambda k}^i, \ldots, x_{\lambda k}^N)$, $x_{\lambda k}^i$ is the i-th element of $X_{\lambda k}$;

S3: Calculate a distance error of P being identified as one of the categories of the selected ground objects, wherein the distance error $Dsit(P_k)$ of P being identified as the k-th category of ground object is calculated and obtained according to the following equations (2) and (3):

$$x_{\lambda k}^k = \max_{1 \leq i \leq N} \mathrm{abs}((x_{\lambda k}^1, x_{\lambda k}^2, \ldots, x_{\lambda k}^i, \ldots, x_{\lambda k}^N)); \tag{2}$$

$$Dsit(P_k) = \mathrm{abs}(x_{\lambda k}^k - 1) + \Sigma_{1 \leq i \leq N, i \neq k} \mathrm{abs}(x_{\lambda k}^i) \tag{3};$$

In equation (2), max is a maximum value operation, abs(·) is the absolute value function, and $x_{\lambda k}^k$ is a maximum component of $X_{\lambda k}$;

S4: Calculate the distance error threshold vector $\theta = (\theta_1, \theta_2, \ldots, \theta_N)$ of A, which includes steps S41~S43;

S41: For the k-th category ground object of A denoted as the spectral curve $S_k$, if it is misidentified as a j-th category ground object, a distance index vector $X_{\lambda j}'$ between $S_k$ and the j-th category ground object is solved according to the following equation (4):

$$(A+\lambda I)X_{\lambda j}'=S_k+\lambda I_j \quad (4)$$

In equation (4), $1 \leq j \leq N$, and $j \neq k$, $X'_{\lambda k}=(x'^{1}_{\lambda k}, x'^{2}_{\lambda k}, \ldots, x'^{i}_{\lambda k}, \ldots, x'^{N}_{\lambda k})$, $x'^{i}_{\lambda k}$ is the i-th element in $X'_{\lambda k}$;

S42: According to the following equation (5), calculate a distance error $\theta_k^j$ for the k-th ground object of A being misidentified as the j-th ground object, then, calculate and obtain an error threshold $\theta_k$ of the k-th ground object according to the following equation (6), $$\theta_k^j = abs(x'^{j}_{\lambda k}-1)+\Sigma_{1 \leq i \leq N, i \neq j} abs(x'^{i}_{\lambda k}) \quad (5);$$

$$\theta_k = \min_{1 \leq j \leq N, j \neq k} \theta_k^j, k = 1, 2, \ldots, N \quad (6)$$

S43: According to steps S41 and S42, sequentially obtain the error thresholds $\theta_1 \sim \theta_N$ of a 1-st category ground object to a N-th category ground object, and construct a distance error threshold vector $\theta=(\theta_1, \theta_2, \ldots, \theta_N)$ of A;

S5: Process identification of the category for the pixel to be identified;

Obtain a minimum value of $Dsit(P_k)$. If the category corresponding to the minimum value is the m-th category, determine whether the minimum value is less than $\theta_m$. If it is satisfied, the pixel to be identified is labelled as the m-th category ground object, otherwise it is labelled as unidentified.

Preferably, in step S1, the number of bands of the remote sensing image is $B_1$, and the number of the categories of the ground objects to be identified is $B_2$.

If $B_1 < B_2$, select $B_1$ categories ground objects to be identified iteratively, and construct a sample spectrum matrix A for each time until all $B_2$ categories ground objects to be identified are selected; the column vectors in A are the spectra of the ground objects, and each element of the spectrum corresponds to a value of $B_1$ number of bands;

If $B_1 \geq B_2$, select $B_2$ number of bands from $B_1$ and construct a sample spectrum matrix A with the ground object to be identified.

Preferably, Step S5 comprises the following steps:

Obtain a minimum value $Dsit(P)$ in $Dsit(P_k)$ based on equation (7):

$$Dsit(P) = Dsit(P_m) = \min_{1 \leq k \leq N} Dsit(P_k), \quad (7)$$

In equation (7), m=1~N, and m is the m-th category ground object in A;

If $Dsit(P)=Dsit(P_m)<\theta_m$, the pixel to be identified is the m-th category ground object, otherwise it is unidentified.

Preferably, the remote sensing image is a multispectral remote sensing image or a hyperspectral remote sensing image.

The idea of the present invention is:

1. The sample spectrum matrix A is constructed using the sample spectrum and number of bands of the ground objects to be identified, and the identification process of the target object in the remote sensing image is transformed into a problem to solve a linear equation system using equation (1).

2. Equation (2) is used to calculate the maximum component of the distance vector between the spectrum of the pixel P to be identified and the k-th category object in A, and then equation (3) is used to obtain the distance error of P being identified as the k-th category ground object.

3. Calculate the distance error threshold vector of the sample spectrum matrix A. Based on A, equation (4) is used to calculate the distance vector for each object category misidentified as another object category, and then equation (5) is used to get the misidentified distance error. Equation (6) is used to get the error threshold for each object category that is misidentified. Finally, the distance error threshold vector of A is constructed.

4. When identifying the category of the pixel to be identified, the identification is considered as a successful result only if both equation (7) and the constraint of $Dsit(P)=Dsit(P_m)<\theta_m$ are satisfied.

Compared with the existing arts, the present invention has the following advantages:

1. Starting from the mathematical characteristics of spectral similarity and according to the theory of condition number of matrix and the mathematical meaning of solutions to a linear system equation, the present invention designs a new method for accurate identification of spectrally similar objects, which is particularly suitable for accurate identification of spectrally similar objects. This method transforms the identification of target objects in remote sensing images into the problem of solving a linear system of equations, thus eliminating the need to rely on expert systems, deep learning models, and large batches of samples.

2. When solving the linear system equations: Since the condition number of the sample matrix corresponding to spectrally similar objects is too large and the determinant value is close to 0, the linear system equation with the sample matrix as the coefficient matrix is an ill-conditioned equation. According to the condition number theory, $\lambda=N+1$ is introduced to transform the equation into a well-conditioned equation. Its essence is also a process of adding features to the ground objects with similar spectral features, thereby adding significant discriminative features to the ground objects with similar spectral features that are difficult to be identified originally and achieving accurate identification of the ground objects with similar spectral features and significantly improving the accuracy of the ground object recognition.

3. By solving the adjusted well-conditioned linear equations, the distance between the pixel to be identified and the selected samples are decomposed into two parts as shown in equation (3), namely, the distance between the maximum component and 1, and the sum of the absolute values of the components except for the maximum component. At the same time, in order to avoid misidentification, a threshold vector based on the sample matrix is introduced, and the pixel to be identified is recognized by the threshold vector.

4. The present invention is simple to operate and calculate. For each type of object to be identified, only one sample is needed, which solves the technical problem that the current high-precision identification method requires expert knowledge and a large number of samples. And according to the comparison results, the present invention has notable recognition accuracy and distinguished performance with obvious advantages on precision identification of target objects in remote sensing images of similar objects.

BRIEF DESCRIPTION OF THE DRAWINGS

FIG. 1 is a flowchart of the present invention.

DETAILED DESCRIPTION OF THE PREFERRED EMBODIMENT

Figure 2:
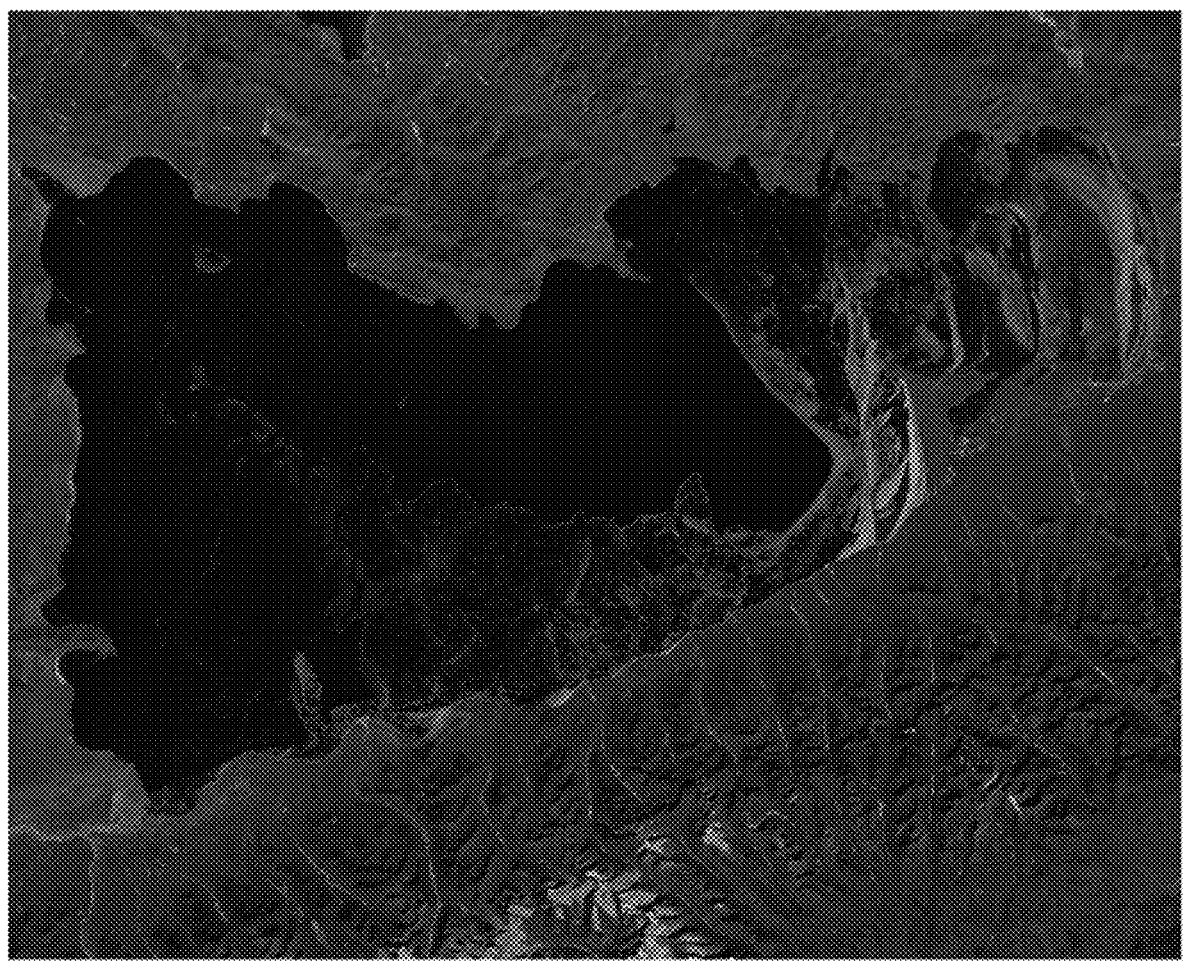
FIG. 2 is a Landsat 8OLI multispectral remote sensing image.

The present invention is further described in detail below with reference to the embodiments.

Embodiment 1: Referring to FIG. 1 of the drawings, a method for identifying similar ground objects with spectral similarity in a remote sensing image based on condition number of matrix, which may be executed by a computer, comprising the following steps:

S1: construct a sample spectrum matrix A;

Obtain a remote sensing image, then obtain a sample spectrum of a ground object to be identified (for each category of the ground objects to be identified, one sample spectrum of one particular category of the ground object is obtained), according to the number of bands of the remote sensing image and the number of categories of the ground object to be identified, construct a sample spectrum matrix A with N rows and N columns, where each column vector of A is a spectrum of one category of the ground object to be identified, and a 1-st to N-th column vectors correspond to a 1-st to N-th categories of the ground objects to be identified respectively, S2: Sequentially calculate distance index vectors $X_{\lambda 1} \sim X_{\lambda N}$ between a spectrum P of a pixel to be identified and the 1-st to N-th categories of ground objects in A selected and constructed from the remote sensing image, wherein a distance index vector $X_{\lambda k}$ between P and a k-th category of the selected ground objects is calculated and obtained according to the following equation (1):

$$(A+\lambda I)X_{\lambda k} = P + \lambda I_k \quad (1)$$

In equation (1), k=1~N, $\lambda$ is an additional supplementary spectral feature information, $\lambda$=N+1, I is the N-order unit matrix, $I_k$ is a N-dimensional unit column vector with the k-th element being set to 1 and the remaining being set to 0, $X_{\lambda k} = (x_{\lambda k}^1, x_{\lambda k}^2, \ldots, x_{\lambda k}^i, \ldots, x_{\lambda k}^N)$, $x_{\lambda k}^i$ is an i-th element of $X_{\lambda k}$;

S3: Calculate a distance error of P being identified as one of the categories of the selected ground objects, wherein the distance error $Dsit(P_k)$ of P being identified as the k-th category of ground object is calculated and obtained according to the following equations (2) and (3):

$$x_{\lambda k}^k = \max_{1 \le i \le N} \mathrm{abs}((x_{\lambda k}^1, x_{\lambda k}^2, \ldots, x_{\lambda k}^j, \ldots, x_{\lambda k}^N)); \quad (2)$$

$$Dsit(P_k) = \mathrm{abs}(x_{\lambda k}^k - 1) + \Sigma_{1 \le i \le N, i \ne k} \mathrm{abs}(x_{\lambda k}^i) \quad (3);$$

In equation (2), max is a maximum value operation, $\mathrm{abs}(\cdot)$ is the absolute value function, and $x_{\lambda k}^k$ is a maximum component of $X_{\lambda k}$;

S4: Calculate a distance error threshold vector $\theta = (\theta_1, \theta_2, \ldots, \theta_N)$ of A, which includes the steps S41~S43;

S41: For the k-th category ground object of A denoted as the spectral curve $S_k$, if it is misidentified as a j-th category ground object, a distance index vector $X_{\lambda j}'$ between $S_k$ and the j-th type ground object is solved according to the following equation (4):

$$(A+\lambda I)X_{\lambda j}' = S_k + \lambda I_j \quad (4),$$

In equation (4), $1 \le j \le N$, and $j \ne k$, $X'_{\lambda k} = (x'_{\lambda k}^1, x'_{\lambda k}^2, \ldots, x'_{\lambda k}^i, \ldots, x'_{\lambda k}^N)$, $x'_{\lambda k}^i$ is the i-th element in $X'_{\lambda k}$;

S42: According to the following equation (5), calculate a distance error $\theta_k^j$ for the k-th ground object of A being misidentified as the j-th ground object, then, obtain an error threshold $\theta_k$ of the k-th ground object according to the following equation (6), $$\theta_k^j = \mathrm{abs}(x'_{\lambda k}^j - 1) + \Sigma_{1 \le i \le N, i \ne j} \mathrm{abs}(x'_{\lambda k}^i) \quad (5);$$

$$\theta_k = \min_{1 \le j \le N, j \ne k} \theta_k^j, \, k = 1, 2, \ldots, N; \quad (6)$$

S43: According to steps S41 and S42, sequentially obtain the error thresholds $\theta_1 \sim \theta_N$ of a 1-st category ground object to a N-th type ground object, and construct a distance error threshold vector $\theta = (\theta_1, \theta_2, \ldots, \theta_N)$ of A;

S5: Process identification of the category for the pixel to be identified;

Obtain a minimum value of $Dsit(P_k)$. If the category corresponding to the minimum value is the m-th category, determine whether the minimum value is less than $\theta_m$. If it is satisfied, the pixel to be identified is labelled as the m-th category ground object, otherwise it is labelled as unidentified.

In step S1, the number of bands of the remote sensing image is $B_1$, and the number of categories of the ground objects to be identified is $B_2$.

If $B_1<B_2$, select $B_1$ categories ground objects to be identified iteratively, and construct a sample spectrum matrix A for each time until all $B_2$ category ground objects to be identified are selected; the column vectors in A are the spectra of the ground objects, and each element of the spectrum corresponds to a value of $B_1$ number of bands;

If $B_1 \geq B_2$, select $B_2$ number of bands from $B_1$ and construct a sample spectrum matrix A with the ground object to be identified.

Step S5 specifically comprises the following steps:

Obtain a minimum value Dsit(P) in Dsit($P_k$) based on equation (7):

$$Dsit(P) = Dsit(P_m) = \min_{1 \leq k \leq N} Dsit(P_k), \quad (7)$$

In equation (7), m=1~N, and m is the m-th category ground object in A;

If Dsit(P)=Dsit($P_m$)<$\theta_m$, the pixel to be identified is the m-th category ground object, otherwise it is unidentified.

The remote sensing image is a multispectral remote sensing image or a hyperspectral remote sensing image.

Embodiment 2: Referring to FIG. 1 to FIG. 12 of the drawings, based on the above Embodiment 1, a more specific method for multispectral remote sensing images is provided, which comprises the following steps:

S1: construct a sample spectrum matrix A;

Obtain a multispectral remote sensing image, as the Landsat 8 OLI data shown in FIG. 2. Seven categories of ground objects to be identified, namely, land, ice, snow, shadow, lake 1 water, lake 2 water, and river water are selected from FIG. 2, wherein four (two pairs) of the ground objects: ice and snow, and shadows and lake 1 water, are spectrally similar objects to each other, as shown in FIGS. 3A, 3B and 3C.

The sample spectrum matrix A with 7 rows and 7 columns is constructed as follows:

$$A = \begin{pmatrix} 0.1067 & 0.0265 & 0.2270 & 0.4892 & 0.0819 & 0.0409 & 0.0357 \\ 0.1206 & 0.0176 & 0.2251 & 0.4855 & 0.0721 & 0.0463 & 0.0359 \\ 0.1827 & 0.0132 & 0.2440 & 0.5294 & 0.0382 & 0.0478 & 0.0586 \\ 0.2375 & 0.0098 & 0.2256 & 0.4978 & 0.0081 & 0.0115 & 0.0278 \\ 0.3144 & 0.0073 & 0.1291 & 0.3052 & 0.0023 & 0.0011 & 0.0028 \\ 0.3947 & 0.0015 & 0.0105 & 0.0375 & 0.0019 & 0.0011 & 0.0089 \\ 0.3195 & 0.0019 & 0.0084 & 0.0346 & 0.0014 & 0.0014 & 0.0088 \end{pmatrix}$$

Figure 3A:
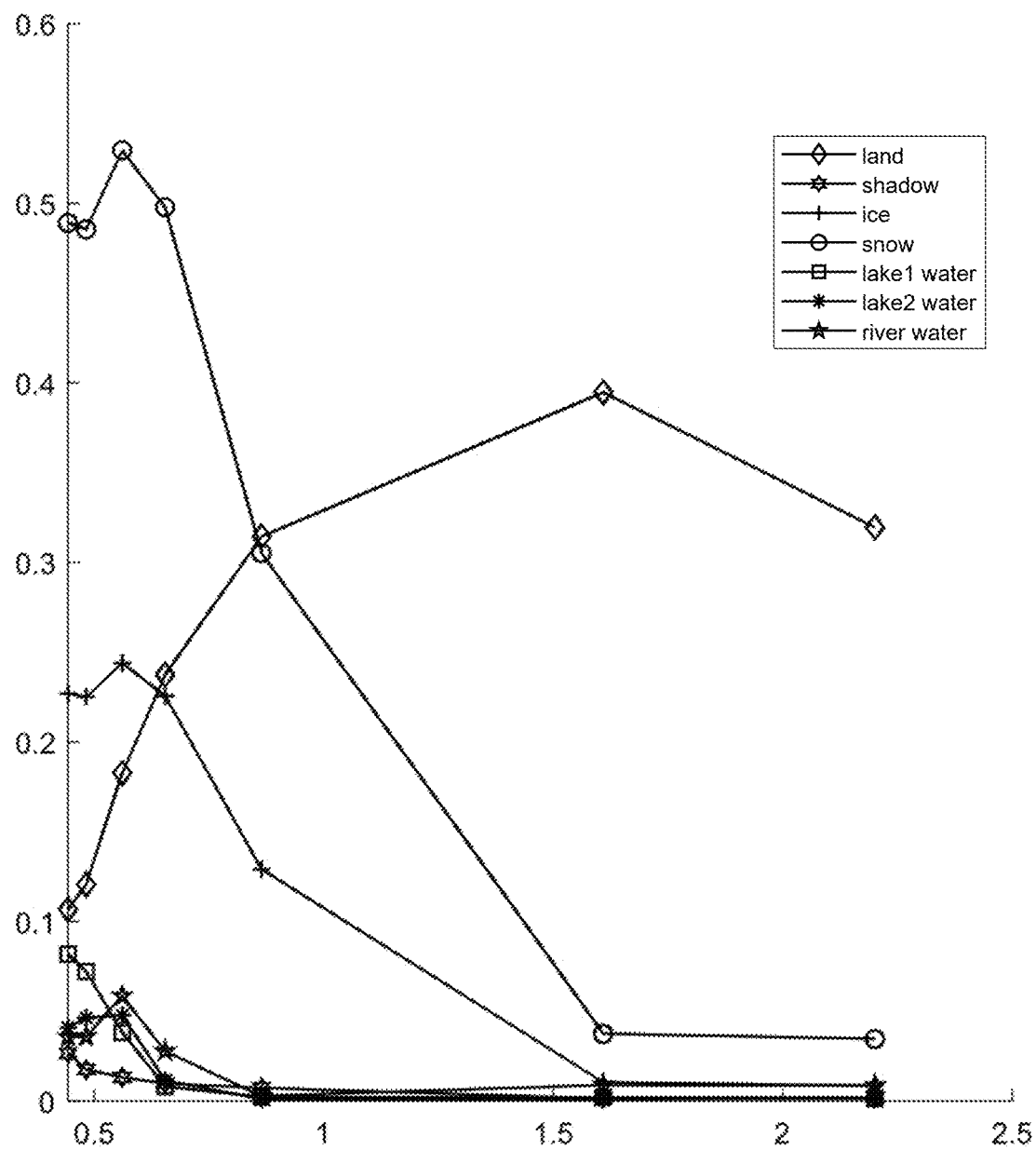
FIG. 3A is the original spectra of 7 object categories obtained from FIG. 2.
Figure 3B:
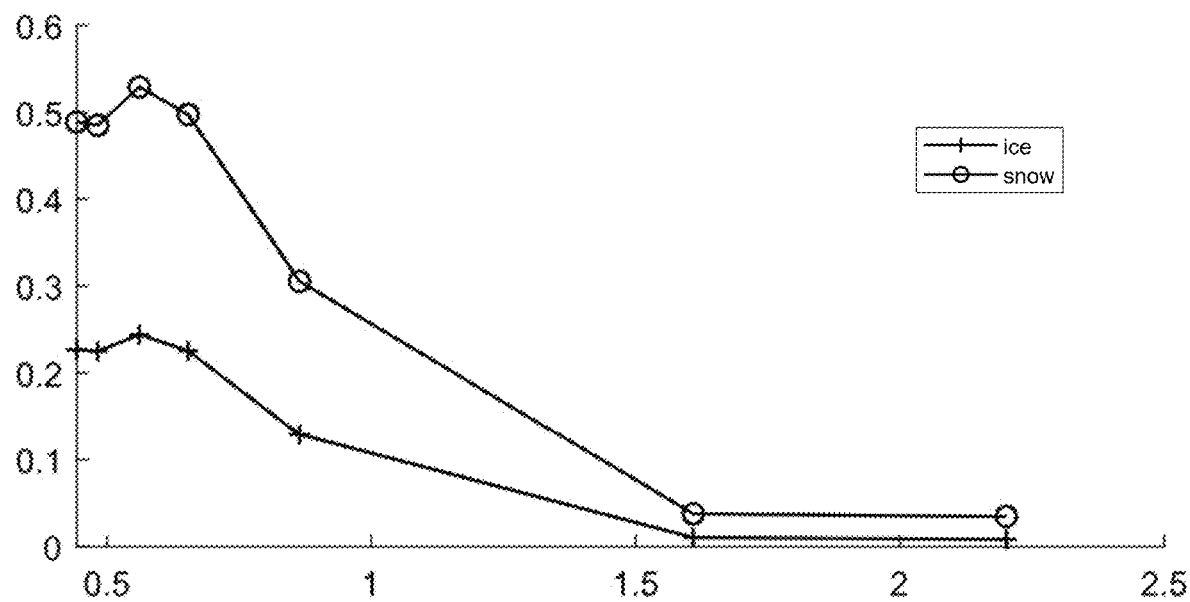
FIG. 3B is the spectrum of ice and snow, which are spectrally similar objects in FIG. 3A.
Figure 3C:
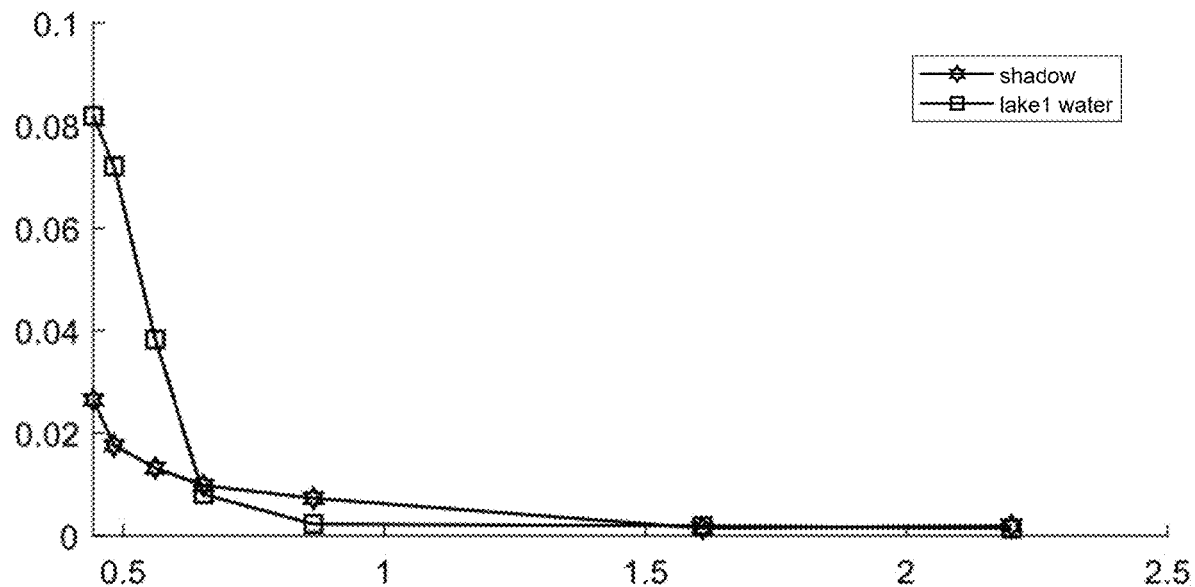
FIG. 3C is the spectra of shadow and lake 1 water, which are spectrally similar objects in FIG. 3A.

In order to show the ground objects with spectral similarity in FIG. 3A in detail, FIG. 3B and FIG. 3C illustrate the spectra of two groups of spectrally similar ground objects: ice and snow; and shadow and lake 1 water respectively.

Figure 4A:
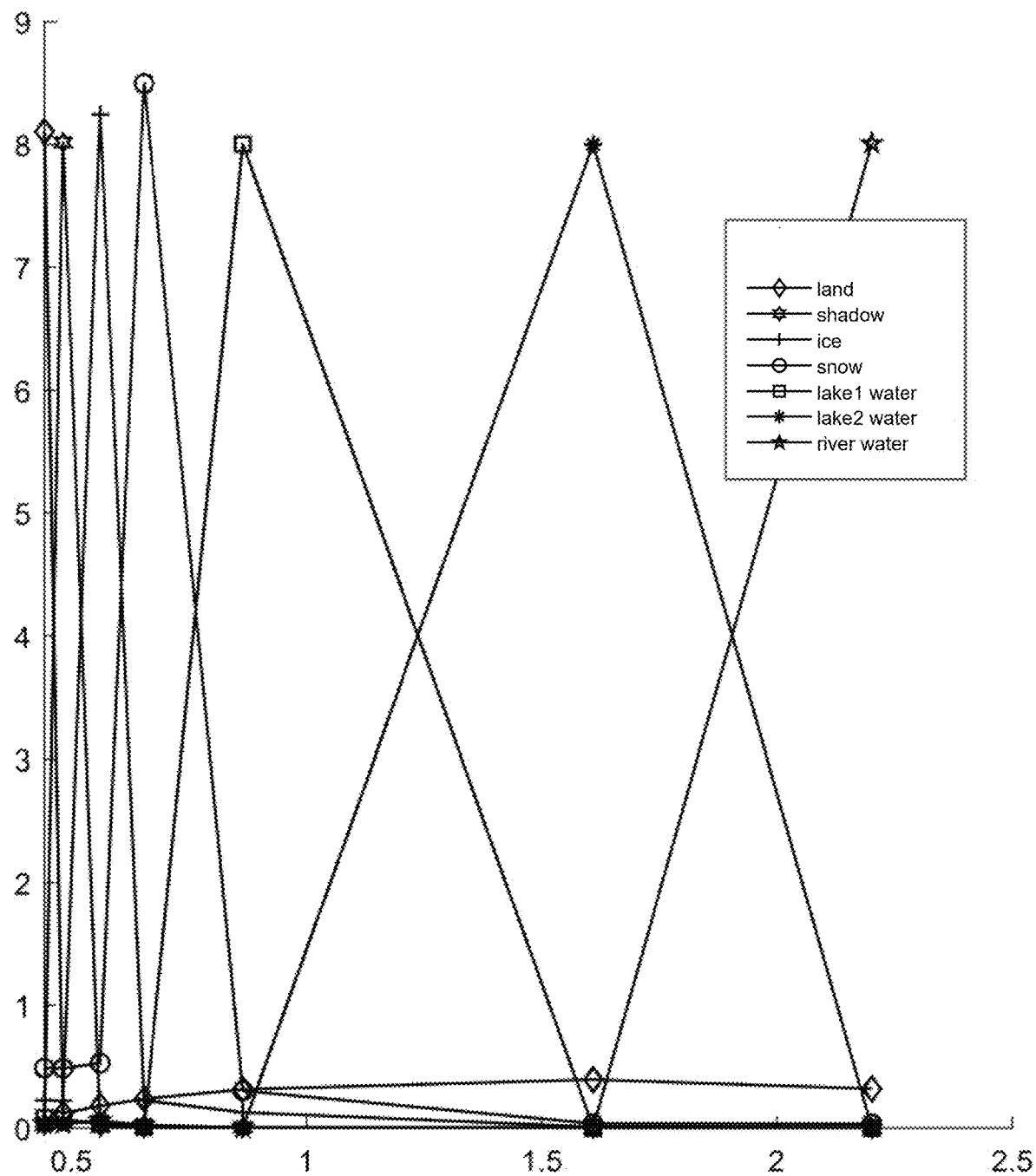
FIG. 4A is the sample spectra after the sample matrix containing spectrally similar objects is converted from an ill-state (ill-conditioned system) to a well-conditioned state (well-conditioned system).
Figure 4B:
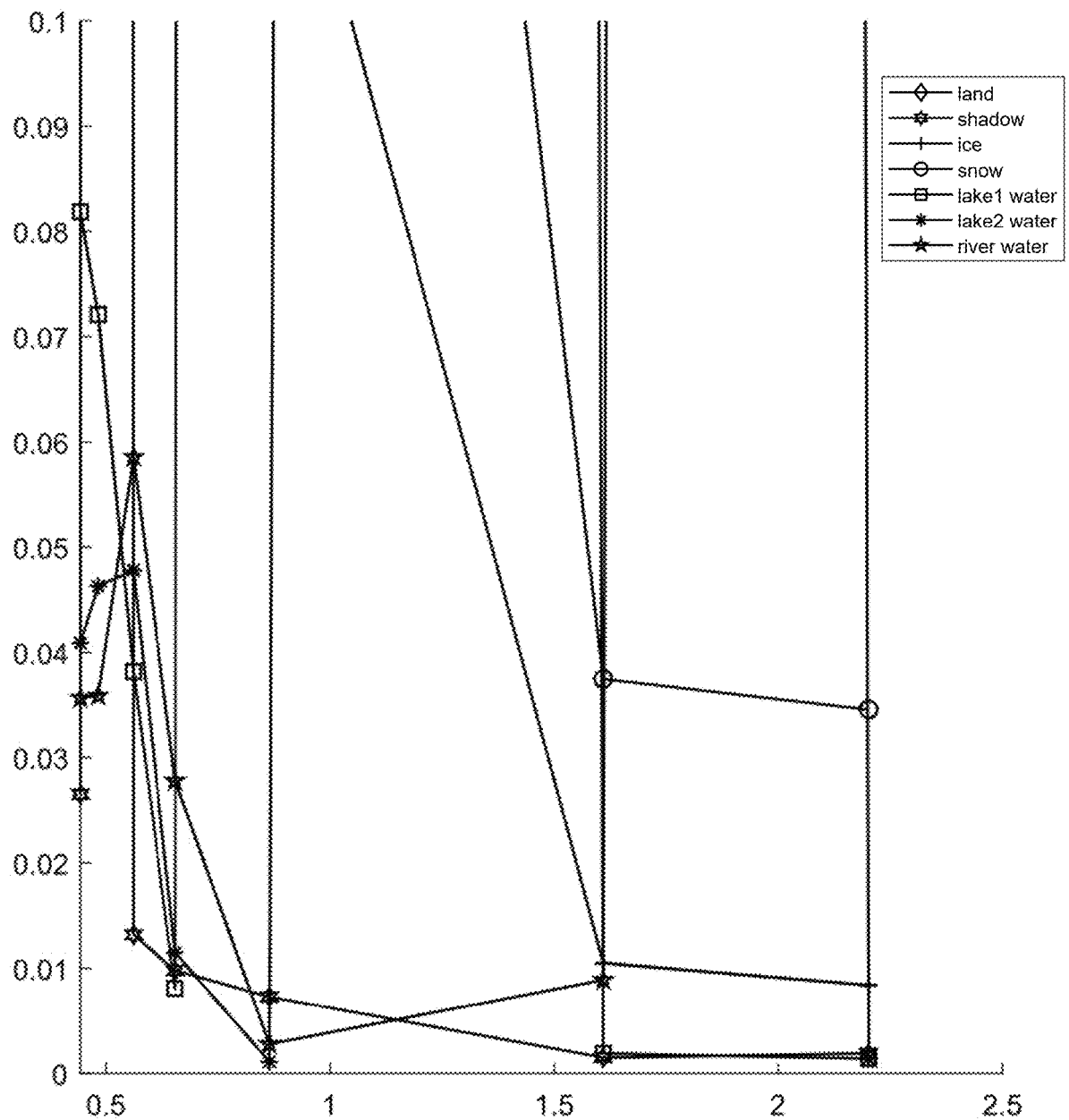
FIG. 4B is the partially enlarged view of the spectra with reflectivity from 0 to 0.1 in FIG. 4A.

S2: Sequentially calculate the distance index vectors $X_{\lambda 1} \sim X_{\lambda N}$ between a spectrum P of a pixel to be identified and the first to the N-th class of the selected sample objects in A from the remote sensing image, and the equation (1) is required to be solved. In equation (1), set $\lambda$=N+1=8. This adjustment process is one of the key technologies of the present invention, and the purpose of this adjustment is to transform the original sample matrix containing spectrally similar objects from an ill-conditioned linear system (an ill-state) to a well-conditioned linear system (a well-conditioned state). Here, take $\lambda$=N+1=8. By changing the coefficient matrix of the equation $(A+\lambda I)X_{\lambda k}=P+\lambda I_k$, the spectra after the adjustment of the original spectra of the samples are obtained, as shown in FIG. 4A and FIG. 4B.

S3: Identical to Step S3 of Embodiment 1.

S4: Identical to Step S4 of Embodiment 1. The distance error threshold vector $\theta=(\theta_1, \theta_2, \ldots, \theta_N)$ of A is obtained.

For a more intuitive presentation, Table 1 is provided as follows:

TABLE 1

| distance error threshold vector of A | | | | | | |
|---|---|---|---|---|---|---|
| $\theta_1$ | $\theta_2$ | $\theta_3$ | $\theta_4$ | $\theta_5$ | $\theta_6$ | $\theta_7$ |
| 0.1504 | 0.0105 | 0.0938 | 0.1434 | 0.0104 | 0.0074 | 0.0074 |

Figure 5:
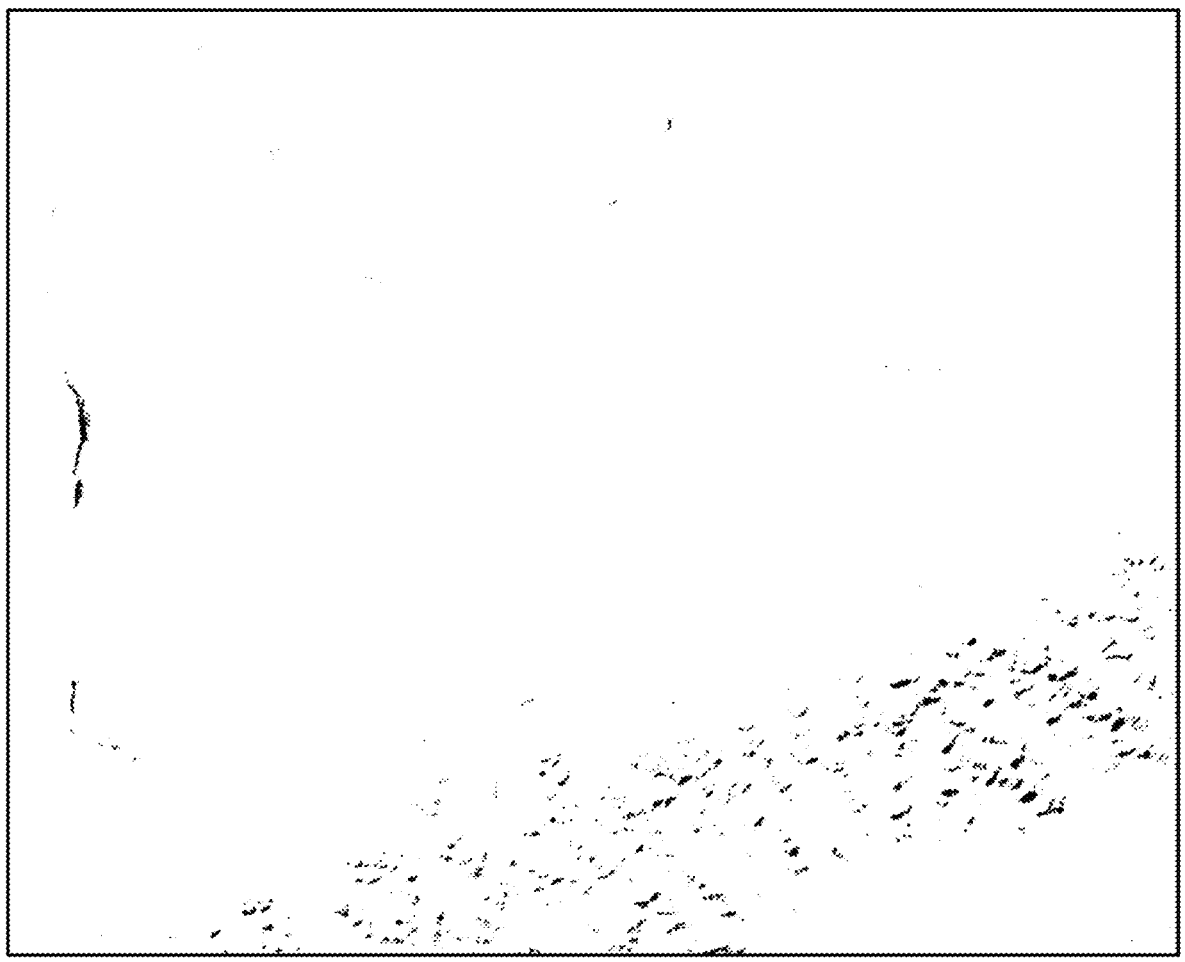
FIG. 5 illustrates the identification result of the shadow in FIG. 2 by using the method of the present invention.
Figure 7:
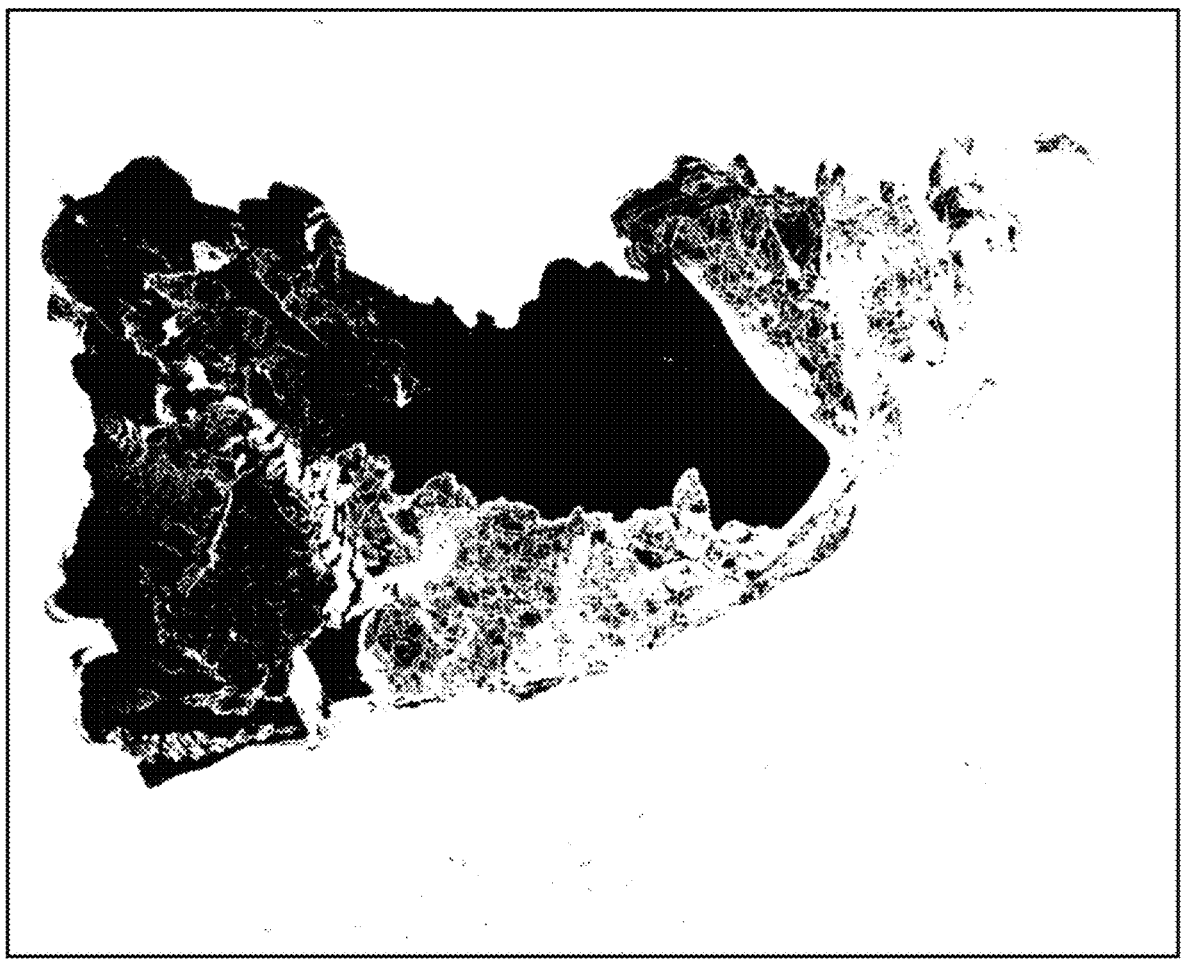
FIG. 7 illustrates the identification result of the lake 1 water in FIG. 2 by using the method of the present invention.
Figure 9:
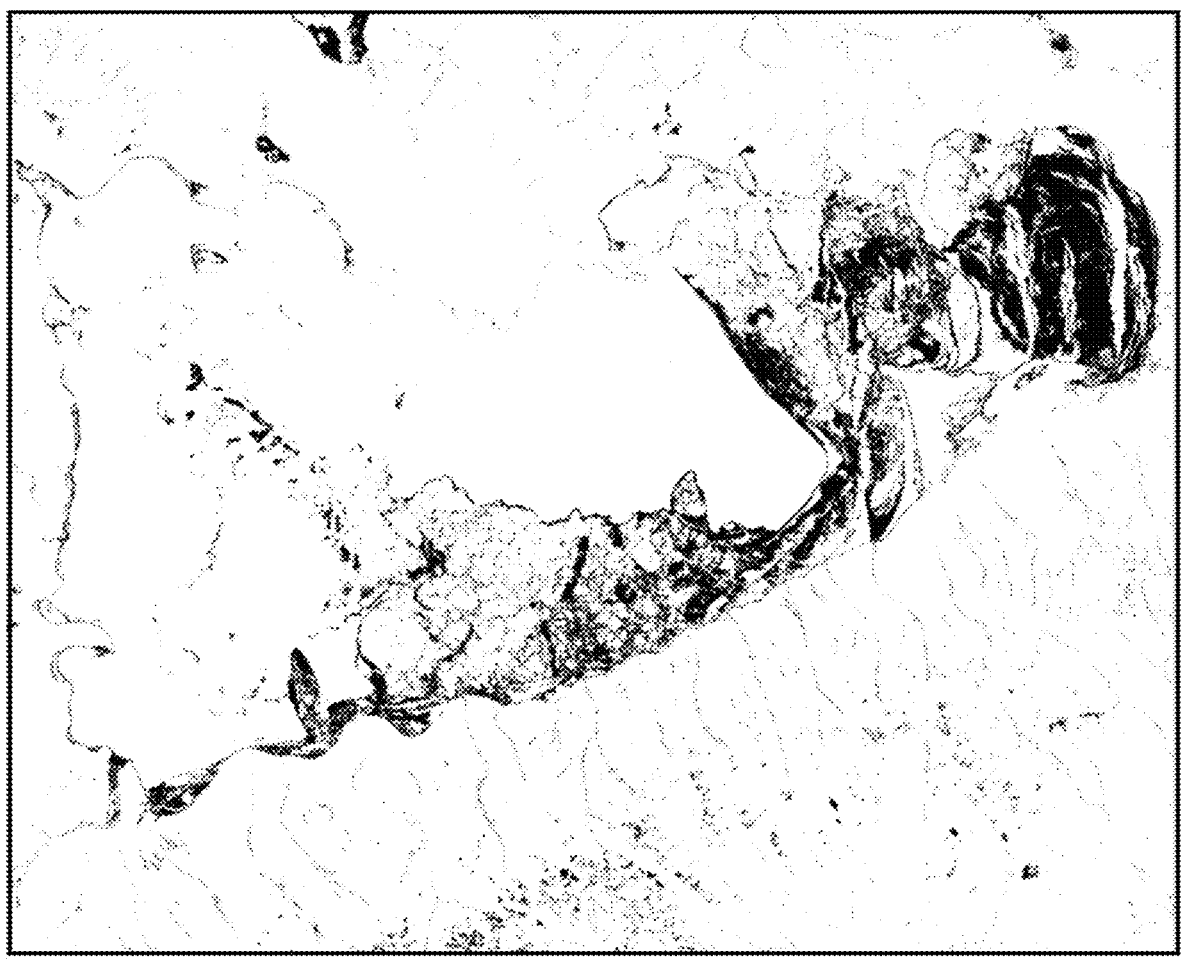
FIG. 9 illustrates the identification result of the ice in FIG. 2 by using the method of the present invention.
Figure 11:
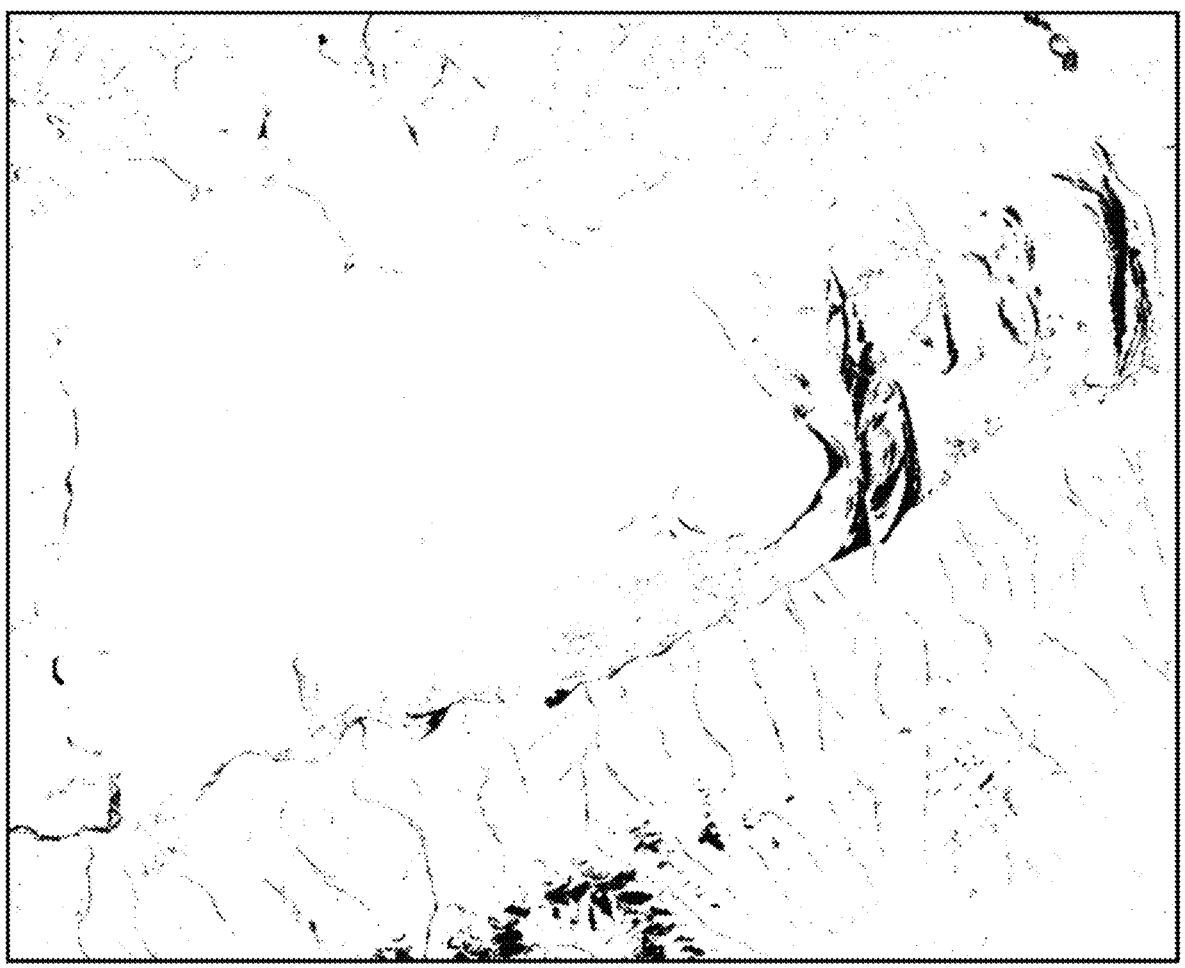
FIG. 11 illustrates the identification result of the snow in FIG. 2 by using the method of the present invention.

S5: Classify and identify the categories of the pixels to be identified. In this embodiment, the identification process is carried out for the image in FIG. 2. The shadow identification results are shown in FIG. 5, the lake water identification results are shown in FIG. 7, the ice identification results are shown in FIG. 9, and the snow identification results are shown in FIG. 11. There are a total of 7 categories of ground objects in this embodiment, among them, shadows and lake 1 water are spectrally similar to each other, ice and snow are spectrally similar to each other, and the other three types are easy to identify, so they are not shown here. Only the identification results of these four categories of ground objects with spectrally similar characteristics difficult to be identified are shown. In other words, the identification results may be generated as images, which are shown in FIGS. 5, 7, 9 and 11 of the drawings.

Figure 6:
FIG. 6 illustrates the identification result of the shadow in FIG. 2 by using the SAM method.
Figure 8:
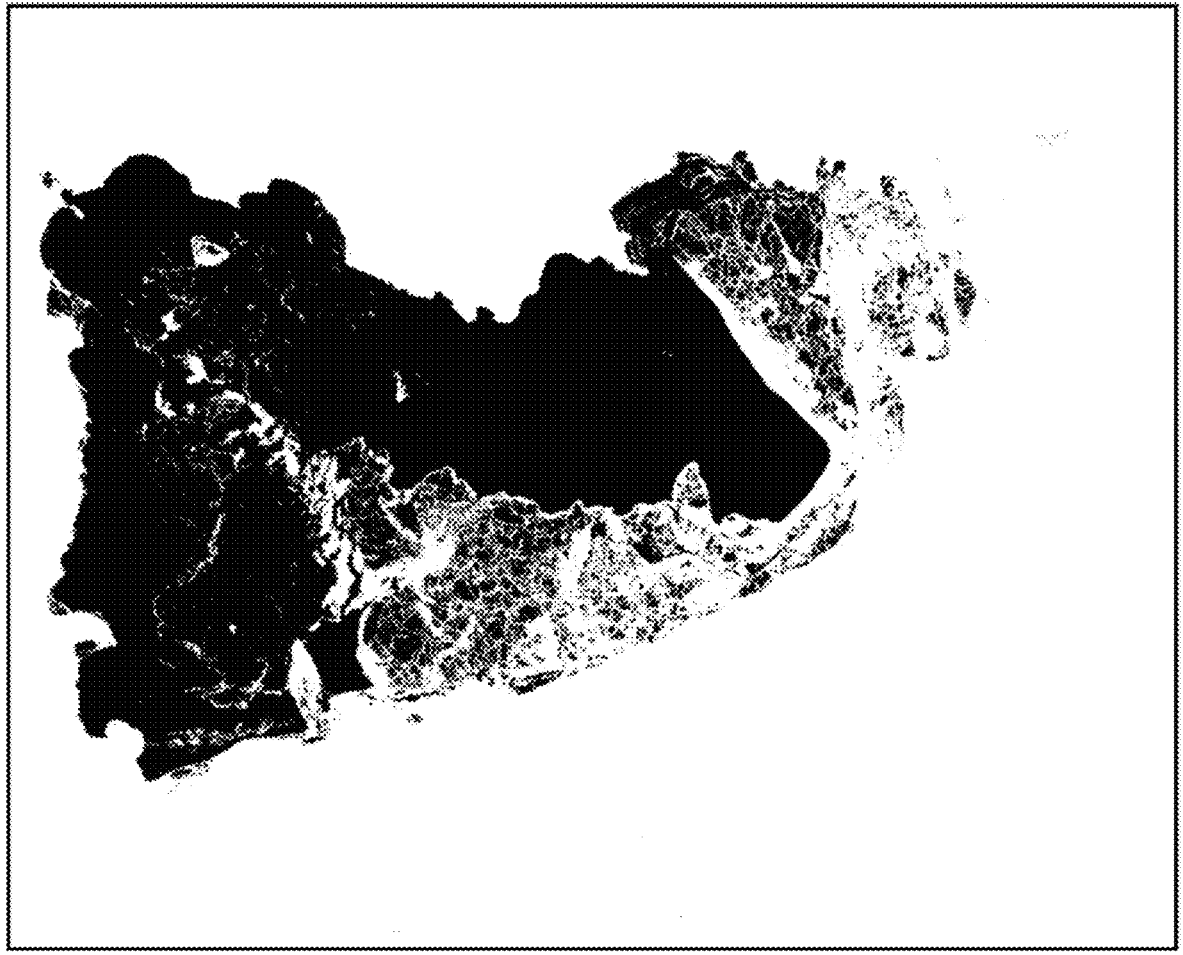
FIG. 8 illustrates the identification result of the lake 1 water in FIG. 2 by using the SAM method.
Figure 10:
FIG. 10 illustrates the identification result of the ice in FIG. 2 by using the SAM method.
Figure 12:
FIG. 12 illustrates the identification result of the snow in FIG. 2 by using the SAM method.

At the same time, in order to compare the identification results of the present invention, we use the traditional spectral angle mapping method, also known as the SAM method, to identify the shadow, lake 1 water, ice and snow from the image shown in FIG. 2. The identification results of shadows are shown in FIG. 6, the identification results of lake 1 water are shown in FIG. 8, the identification results of ice are shown in FIG. 10, and the identification results of snow are shown in FIG. 12.

From FIG. 5 to FIG. 12, the identification results in these figures are demonstrated as black areas. Comparing FIG. 5 to FIG. 12, it can be seen that the method of the present invention has unique advantages in multispectral data, especially for ice and snow, shadow and lake 1 water objects with similar spectra in Landsat 8 OLI data. The method of the present invention can accurately identify the different ground objects, and its performance is significantly better than the traditional SAM method. The comparison results from FIG. 5 to FIG. 12 clearly show that SAM not only misidentified the lake 1 water and the shadow, but also failed to identify ice and snow with similar spectra.

Embodiment 3: Referring to FIG. 1, based on the above Embodiment 1, a more specific method for hyperspectral remote sensing images is provided, which comprises the followings steps:

S1: obtain Salinas-A hyperspectral remote sensing data, select 6 bands from 204 bands, which are at 31 nm, 45 nm, 72 nm, 92 nm, 121 nm and 168 nm, obtain reflectance data at 31 nm, 45 nm, 72 nm, 92 nm, 121 nm and 168 nm, and construct a sample spectrum matrix A containing 6 categories of ground objects to be identified;

S2: carrying out the step S2 of embodiment 1, wherein λ=N+1=6+1=7, and the sample spectrum matrix A is adjusted.

The remaining steps S3 to S5 are the same as steps S3 to S5 of Embodiment 1.

Finally, in order to illustrate the performance of the present invention, the method of the present invention and the SAM method are used to identify six categories of objects to be identified in the same Salinas-A hyperspectral remote sensing image, and the identification results are shown in Table 2.

TABLE 2

Comparison results of the present invention and traditional SAM for Salinas-A

| Cf. Factors | Type | | | | | | Unknown Ground Object | Average Accuracy of | |
|---|---|---|---|---|---|---|---|---|---|
| | | | | | | | | Excluding Unknown Ground Object | Including Unknown Ground Object |
| | 1 | 2 | 3 | 4 | 5 | 6 | | | |
| Ground Real Pixels | 391 | 1343 | 616 | 1525 | 674 | 799 | 1790 | — | — |
| Present Invention | 390 | 666 | 375 | 1519 | 672 | 785 | 141 | 82.4% | 63.72% |
| SAM | 389 | 715 | 553 | 889 | 669 | 789 | 133 | 74.87% | 57.96% |

It can be seen from Table 2 that: for relatively simple scene hyperspectral data, the recognition effect of the present invention using 6 bands is better than the recognition effect of the SAM using all 204 bands. From the statistical results of the recognition accuracy of the pixels for including or excluding unknown ground objects, it is found that the average accuracy of the present invention is 82.4% and 63.72% respectively, which is better than that of SAM's 74.87% and 57.96%. (An unknown ground object in this case refers to a ground object not classified as any one of the types 1-6 ground objects.)

The above description is only a description of the preferred embodiment of the present invention and is not intended to be limiting. Any modifications, equivalent substitutions and improvements made within the spirit and principles of the present invention should be included in the protection scope of the present invention.

What is claimed is:

1. A method for identifying similar ground objects with spectral similarity in remote sensing images based on condition number of matrix, characterized in that, the method comprising the steps of:

S1: Construct a sample spectrum matrix A;

obtaining a sample spectrum of a ground object to be identified, according to a number of bands of the remote sensing image and a number of categories of the ground objects to be identified, constructing the sample spectrum matrix A with N rows and N columns, wherein each column vector of A is a spectrum of one category of the ground object to be identified, and a 1-st to N-th column vectors correspond to a 1-st to N-th categories of the ground object to be identified respectively, S2: Process sequential calculation to obtain distance index vectors $X_{\lambda 1} \sim X_{\lambda N}$ between a spectrum P of a pixel to be identified and the 1-st to the N-th categories of the objects in A selected and constructed from the remote sensing image, wherein a distance index vector $X_{\lambda k}$ between P and a k-th class of the selected objects is calculated and obtained according to the following equation (1):

$$(A+\lambda I)X_{\lambda k}=P+\lambda I_k \qquad (1),$$

wherein k=1~N, λ is additional supplementary spectral feature information, λ=N+1, I is an N-order unit matrix, $I_k$ is a N-dimensional unit column vector with the k-th element being 1 and the remaining element being 0, $X_{\lambda k}=(x_{\lambda k}^1, x_{\lambda k}^2, \ldots, x_{\lambda k}^i, \ldots, x_{\lambda k}^N)$, $x_{\lambda k}^i$ is an i-th element of $X_{\lambda k}$;

S3: Process calculation to obtain a distance error of P being identified as one of the categories of the selected ground objects, wherein a distance error $Dsit(P_k)$ of P being identified as the k-th category of the ground object is calculated and obtained according to the following equations (2) and (3):

$$x_{\lambda k}^k = \max_{1 \le i \le N} \text{abs}((x_{\lambda k}^1, x_{\lambda k}^2, \ldots, x_{\lambda k}^i, \ldots, x_{\lambda k}^N)), \qquad (2)$$

$$Dsit(P_k)=\text{abs}(x_{\lambda k}^k-1)+\Sigma_{1 \le i \le N, i \ne k} \text{abs}(x_{\lambda k}^i) \qquad (3),$$

wherein max is a maximum value operation, abs(·) is the absolute value function, and $x_{\lambda k}^k$ is a maximum component of $X_{\lambda k}$;

S4: Process calculation to obtain a distance error threshold vector $\theta=(\theta_1, \theta_2, \ldots, \theta_N)$ of A, which comprises steps S41~S43 as follows:

S41: For the k-th category ground object of A denoted by a spectral curve $S_k$, if it is mis-identified as a j-th category ground object, a distance index vector $X_{\lambda j}'$ between $S_k$ and the j-th category ground object is solved according to the following equation (4):

$$(A+\lambda I)X_{\lambda j}'=S_k+\lambda I_j \qquad (4),$$

wherein 1≤j≤N, and j≠k, $X'_{\lambda k}=(x'_{\lambda k}^1, x'_{\lambda k}^2, \ldots, x'_{\lambda k}^i, \ldots, x'_{\lambda k}^N)$, $x'_{\lambda k}^i$ is an i-th element in $X'_{\lambda k}$;

S42: processing calculation to obtain a distance error $\theta_k^j$ of the k-th ground object of A being misidentified as the j-th ground object according to the following equation (5), then processing calculation to obtain an error threshold $\theta_k$ of the k-th ground object according to the following equation (6), $$\theta_k^j = abs(x'_{\lambda_k}{}^j - 1) + \Sigma_{1 \le i \le N, i \ne j} abs(x'_{\lambda_k}{}^i) \qquad (5);$$

$$\theta_k = \min_{1 \le j \le N, j \ne k} \theta_k^j, k = 1, 2, \ldots, N; \qquad (6)$$

S43: according to steps S41 and S42, process calculation sequentially to obtain the error thresholds $\theta_1 \sim \theta_N$ of a 1-st category ground object to a N-th category ground object, and constructing a distance error threshold vector $\theta = (\theta_1, \theta_2, \ldots, \theta_N)$ of A;

S5: Process identification of the category of the pixel to be identified;

processing calculation to obtain a minimum value of $Dsit(P_k)$, if the category corresponding to the minimum value is the m-th category, determine whether the minimum value is less than $\theta_m$, if yes, label the pixel to be identified as the m-th category ground object, otherwise label the pixel as unidentified.

2. The method for identifying similar ground objects with spectral similarity in remote sensing images based on condition number of matrix according to claim 1, characterized in that, in the step S1, the number of bands of the remote sensing image is $B_1$, and the number of categories of the ground objects to be identified is $B_2$, if $B_1 < B_2$, select $B_1$ categories ground objects to be identified repeatedly for multiple times, and construct a sample spectrum matrix A for each time until all $B_2$ categories ground objects to be identified are selected; the column vectors in A are the spectra of the ground object, and each element of the spectrum corresponds to a value of $B_1$ number of bands;

if $B_1 \ge B_2$, select $B_2$ number of bands from $B_1$ and construct a sample spectrum matrix A with the ground object to be identified.

3. The method for identifying similar ground objects with spectral similarity in remote sensing images based on condition number of matrix according to claim 1, characterized in that, step S5 comprises the steps of:

obtaining a minimum value Dsit(P) in $Dsit(P_k)$ according to equation (7):

$$Dsit(P) = Dsit(P_m) = \min_{1 \le k \le N} Dsit(P_k), \qquad (7)$$

wherein m=1~N, and m is the m-th category ground object in A, if $Dsit(P) = Dsit(P_m) < \theta_m$, the pixel to be identified is the m-th category ground object, otherwise the pixel to be identified is unidentified.

4. The method for identifying similar ground objects with spectral similarity in remote sensing images based on condition number of matrix according to claim 1, characterized in that, the remote sensing image is a multispectral remote sensing image or a hyperspectral remote sensing image.

\* \* \* \* \*